United States Patent
Gim

(10) Patent No.: US 11,492,036 B2
(45) Date of Patent: Nov. 8, 2022

(54) APPARATUS AND METHOD OF CONTROLLING MOTOR DRIVEN STEERING

(71) Applicants: Hyundai Motor Company, Seoul (KR); Kia Motors Corporation, Seoul (KR)

(72) Inventor: Gyeong Seop Gim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 70 days.

(21) Appl. No.: 17/008,851

(22) Filed: Sep. 1, 2020

(65) Prior Publication Data

US 2021/0094607 A1 Apr. 1, 2021

(30) Foreign Application Priority Data

Sep. 26, 2019 (KR) .................. 10-2019-0118587

(51) Int. Cl.
*B62D 5/04* (2006.01)
*B62D 15/02* (2006.01)
*B62D 6/02* (2006.01)
*B60W 10/20* (2006.01)

(52) U.S. Cl.
CPC ........... *B62D 5/0472* (2013.01); *B60W 10/20* (2013.01); *B62D 5/046* (2013.01); *B62D 5/0463* (2013.01); *B62D 5/0481* (2013.01); *B62D 6/02* (2013.01); *B62D 15/021* (2013.01); *B60W 2520/10* (2013.01); *B60W 2540/18* (2013.01)

(58) Field of Classification Search
CPC .............................. B62D 5/0472; B62D 6/06
See application file for complete search history.

(56) References Cited

U.S. PATENT DOCUMENTS

| 5,810,111 | A  | * | 9/1998 | Takeuchi   | H02K 11/33  |
|-----------|----|---|--------|------------|-------------|
|           |    |   |        |            | 180/443     |
| 6,246,197 | B1 | * | 6/2001 | Kurishige  | B62D 5/046  |
|           |    |   |        |            | 318/434     |
| 6,407,524 | B1 | * | 6/2002 | Endo       | B62D 5/046  |
|           |    |   |        |            | 318/803     |
| 6,427,105 | B1 | * | 7/2002 | Matsushita | B62D 5/046  |
|           |    |   |        |            | 701/41      |

(Continued)

FOREIGN PATENT DOCUMENTS

| CN | 112550436    | A  | * | 3/2021 | ........... B62D 15/021 |
| DE | 102020123458 | A1 | * | 4/2021 | ........... B62D 15/021 |

(Continued)

*Primary Examiner* — Kevin R Steckbauer
(74) *Attorney, Agent, or Firm* — Morgan, Lewis & Bockius LLP

(57) ABSTRACT

An apparatus and method of controlling a motor driven steering system may selectively perform a motor current control of the motor driven steering system for reducing motor noise according to a present motor-applied current applied to a steering motor of the motor driven steering system when it is determined from vehicle speed information or wheel speed information detected by a first sensor that a vehicle is currently in a stopped state and it is determined from steering angle information detected by a second sensor that a steering wheel is currently in a steering wheel holding state.

14 Claims, 7 Drawing Sheets

(56) References Cited

U.S. PATENT DOCUMENTS

| | | | | |
|---|---|---|---|---|
| 6,831,477 | B2* | 12/2004 | Fukusumi | G01R 31/006 324/765.01 |
| 6,927,548 | B2* | 8/2005 | Nishizaki | H02P 21/06 318/434 |
| 7,873,453 | B2* | 1/2011 | Kobayashi | B62D 5/0472 701/41 |
| 8,267,220 | B2* | 9/2012 | Sugiyama | B62D 5/0463 180/443 |
| 8,626,394 | B2* | 1/2014 | Kezobo | B62D 5/0472 701/1 |
| 9,701,338 | B2* | 7/2017 | Tsubaki | B62D 6/02 |
| 9,988,077 | B2* | 6/2018 | Chiba | B62D 5/0472 |
| 10,530,282 | B2* | 1/2020 | Pramod | H02P 29/027 |
| 10,780,914 | B2* | 9/2020 | Sights | B62D 15/025 |
| 2003/0179004 | A1* | 9/2003 | Fukusumi | G01R 31/343 73/114.61 |
| 2006/0012323 | A1* | 1/2006 | Endo | B62D 5/0463 318/432 |
| 2006/0176005 | A1* | 8/2006 | Ta | H02P 6/182 318/650 |
| 2007/0017735 | A1* | 1/2007 | Kataoka | B62D 6/008 180/446 |
| 2007/0107978 | A1* | 5/2007 | Aoki | B62D 5/0472 180/446 |
| 2008/0067960 | A1* | 3/2008 | Maeda | B62D 5/046 180/443 |
| 2008/0191655 | A1* | 8/2008 | Ueda | B62D 5/0487 318/449 |
| 2008/0277192 | A1* | 11/2008 | Nishimura | B62D 5/0463 180/444 |
| 2009/0079373 | A1* | 3/2009 | Nagase | B62D 5/0487 318/434 |
| 2016/0318548 | A1* | 11/2016 | Tsubaki | B62D 6/06 |
| 2017/0346423 | A1* | 11/2017 | Pramod | H02P 29/027 |
| 2017/0349208 | A1* | 12/2017 | Sugawara | B62D 5/0463 |
| 2020/0172161 | A1* | 6/2020 | Sugawara | B62D 5/0463 |
| 2020/0172162 | A1* | 6/2020 | Sugawara | B62D 5/0472 |
| 2020/0172163 | A1* | 6/2020 | Sugawara | B62D 6/008 |
| 2020/0189654 | A1* | 6/2020 | Sugawara | B62D 5/0463 |
| 2021/0094607 | A1* | 4/2021 | Gim | H02K 11/27 |

FOREIGN PATENT DOCUMENTS

| | | | | |
|---|---|---|---|---|
| JP | 2006188183 A | * | 7/2006 | B62D 15/021 |
| JP | 2009-044846 A | | 2/2009 | |
| JP | 2021054395 A | * | 4/2021 | B62D 15/021 |

* cited by examiner

APPARATUS AND METHOD OF CONTROLLING MOTOR DRIVEN STEERING

CROSS-REFERENCE TO RELATED APPLICATION

The present application claims priority to Korean Patent Application No. 10-2019-0118587 filed on Sep. 26, 2019, the entire contents of which is incorporated herein for all purposes by this reference.

BACKGROUND OF THE INVENTION

Field of the Invention

The present invention relates to an apparatus and method of controlling a motor driven steering system. More particularly, it relates to an apparatus and method of controlling a motor driven steering system, which can solve effectively a motor noise problem caused by an unstable contact state between a brush and a commutator of a DC motor in a vehicle employing the DC motor instead of a blushless AC (BLAC) motor as a steering motor.

Description of Related Art

As a power steering system for reducing a driver's steering force when a vehicle is steered, a hydraulic power steering (HPS) system that assists the driver's steering force using a hydraulic pressure generated by a hydraulic pump and a motor driven power steering (hereinafter, referred to as MDPS) system that assists the driver's steering force using an output torque of an electric motor have been known.

In the above systems, the MDPS system can control the output torque of the electric motor (steering motor) for steering assistance according to driving conditions of the vehicle, providing enhanced steering performance and steering feeling, as compared with the hydraulic steering system.

Accordingly, the MDPS system which can change and control a steering assisting force generated by the motor output according to the driving conditions has been widely applied to vehicles which have been recently released onto a market.

The MDPS system may include sensors such as a steering angle sensor configured for detecting a steering angle (column input angle) according to a driver's steering wheel manipulation, a torque sensor configured for detecting a driver's steering torque (steering wheel torque, column torque) input through a steering wheel, a vehicle speed sensor, a wheel speed sensor, an acceleration sensor, an RPM sensor, a yaw rate sensor and the like, a controller (MDPS EC), and a steering motor (MDPS motor).

In such the above configuration, to control a driving and an output of the steering motor, the controller is configured to receive driver's steering input information such as a steering angle, a steering angular speed, a steering torque, and the like, and vehicle status information such as a vehicle speed, a wheel speed, an RPM (revolution per minute) of the engine, a yaw rate, and the like, from signals of the above sensors.

Here, the steering angle represents a rotational position of the steering wheel, the steering angular speed is a rotational angular speed value of the steering wheel that may be obtained through a differentiation of steering angle signal, etc., and the steering torque is a torque applied to the steering wheel by a driver, that is, a driver's input torque for steering the steering wheel.

The torque sensor is provided for detecting the steering torque that is input by a driver using the steering wheel, and it has been widely known to detect this steering torque using a twisting degree of a torsion bar. Also, the acceleration sensor is employed for detecting an acceleration of the vehicle in all directions to determining a driving status of the vehicle.

In addition, the wheel speed sensor is a sensor for detecting a rotation speed of the vehicle wheel to determine a traveling condition of the vehicle, and because the vehicle speed may be known from the wheel speed signal, the wheel speed sensor may be used as a vehicle speed sensor configured for detecting the vehicle speed.

The controller controls the output of the steering motor based on the driver's steering input information and the vehicle status information to allow adjusted torque to be generated for assisting the steering. In a conventional MDPS system, the output of the steering motor is controlled by the controller configured for controlling a motor current applied to the steering motor.

At this time, the controller is configured to determine the current amount based on information collected from the vehicle, that is, the driver's steering input information and the vehicle status information, applies the current to the steering motor, and generates a steering assisting torque, which is a force for assisting the driver's steering force, through a driving of the motor at this time.

On the other hand, for reducing manufacturing cost, the trend is that DC motors have been widely used as the steering motors (MDPS motors) for small and medium sized vehicles, instead of BLAC (brushless AC) motors.

However, unlike the BLAC motor, the DC motor has a disadvantage in that because a brush and a commutator are in contact with each other and operate, noise, vibration, and harshness (NVH) is not good, in terms of structure.

This causes displeasure in a driver, and becomes thus one of the factors undermining marketability of the vehicle employing the DC motor as the steering motor. As a result, there is need to improve this structure.

In the vehicle employing the MDPS system provided with the DC motor as the steering motor, when the steering wheel is held at a specific position while the vehicle is stopped, that is, when the steering wheel is held at a position where a specific amount of current or more is applied to the DC motor, there is a need to improve the noise problem generated in the DC motor.

If the DC motor of the MDPS system assists the steering so that the steering wheel is held (fixed) in a specific position while the vehicle is stopped, the controller is configured to apply a large current to the DC motor to allow the DC motor to generate a force for assisting the steering. At this time, the DC motor may generate "humming" noise if it is in a position where an unstable contact between the brush and the commutator may be caused.

FIGS. 4, 5, 6 and 7 are views for describing problems caused when the DC motor is employed as the steering motor. Here, FIG. 4 is a view showing a contact state between a brush and a commutator in a known DC motor, FIG. 5 shows a stable contact state between the brush and the commutator, and FIG. 6 is a view for describing an unstable contact state between the brush and the commutator.

In FIG. 5 and FIG. 6, reference numeral 3 indicates a brush holder to which a brush 1 is fixed, and reference numeral 4 indicates a spring supporting elastically the brush 1 and the brush holder 3. In the DC motor, the brush 1 is elastically supported by the spring 4 to be kept in a state in which it is always in contact with the commutator 2 which is rotated with a rotor.

In addition, FIG. 7 is a view for describing a state in which current variation caused by an unstable contact state between the brush 1 and the commutator 2 in the DC motor is increased.

When a large current is applied to the DC motor during steering assistance for hold (fixing) the steering wheel at a specific position, fine movement of the commutator may be generated due to an unstable contact between the brush 1 and the commutator 2, and a flow of the current is repeatedly fluctuated instantaneously between points "a" and "b" in FIG. 6.

At this time, instantaneous resistance fluctuation may be generated, and, current oscillation may be significantly generated due to instantaneous current fluctuation and resistance fluctuation between the brush 1 and the commutator 2.

Referring to FIG. 7, it may be seen that, after the steering wheel is held, a phenomenon in which the current oscillation is remarkably increased as shown on a right side occurs.

As the current oscillation is increased as above, resonance is generated due to current frequency in the motor system, and vibration is generated along with "humming" noise due to the resonance.

In using the DC motor, although a damping coupler that can reduce noise and vibration has been employed to solve the above-mentioned noise and vibration problem, this causes manufacturing cost to be increased.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an apparatus and a method which can solve effectively motor noise and vibration problems caused by a unstable contact state between a brush and a commutator of a DC motor in a vehicle employing the DC motor instead of a blushless AC (BLAC) motor as a steering motor.

To achieve the above object, various aspects of the present invention provide a control apparatus of a motor driven steering system, including a first sensor configured for detecting a vehicle speed or a wheel speed; a second sensor configured for detecting a steering angle in a response to a driver's steering wheel manipulation; and a controller connected to the first sensor and the second sensor and configured to selectively perform a motor current control of the motor driven steering system for reducing motor noise according to a present motor-applied current applied to a steering motor of the motor driven steering system when the controller determines, from vehicle speed information or wheel speed information detected by the first sensor, that a vehicle is currently in a stopped state and the controller determines, from steering angle information detected by the second sensor, that a steering wheel is currently in a steering wheel holding state.

Here, the steering motor may be a DC motor.

In addition, it is preferable to set the controller to determine that the steering wheel is in a steering wheel holding state upon determining that the steering angle received from the second sensor is not changed for a predetermined reference time period.

Furthermore, it is preferable to set the controller to perform a motor current control of the motor driven steering system for reducing motor noise upon determining that a vehicle is currently in the stopped state, the steering wheel is currently in the steering wheel holding state, and the present motor-applied current is equal to or greater than a predetermined reference current value.

The controller may be set to reduce a current applied to the steering motor to a preset control target value upon performing the motor current control for reducing motor noise.

In addition, the controller may be set to reduce the current applied to the steering motor until reaching the preset control target value at a predetermined gradient value upon performing the motor current control for reducing motor noise.

The preset control target value may be set as a motor-applied current value at which the motor noise is not generated in the steering motor of a corresponding vehicle, and may be input to the controller.

In addition, the controller may be set to reduce the current applied to the steering motor to the preset control target value and keep it constant, and then to increase the current applied to the steering motor upon determining a driver's steering input from the steering angle information detected by the second sensor.

In addition, in another aspect, various aspects of the present invention provide the method of controlling a motor driven steering system, including detecting, by a first sensor, a vehicle speed or a wheel speed, and detecting, by a second sensor, a steering angle in a response to a driver's steering wheel manipulation; determining, by a controller, that a vehicle is currently in a stopped state from vehicle speed information or wheel speed information received from the first sensor; in the state in which the vehicle is stopped, determining, by a controller, that a steering wheel is currently in a steering wheel holding state from steering wheel information detected by the second sensor; and selectively performing, by the controller, a motor current control of a motor driven steering system for reducing motor noise according to a present motor-applied current applied to a steering motor of the motor driven steering system upon determining that the vehicle is currently in the stopped state and the steering wheel is in the steering wheel holding state.

Other aspects and exemplary embodiments of the present invention are discussed infra.

In this way, according to the apparatus and method of controlling the steering system according to various exemplary embodiments of the present invention, it is possible to effectively solve motor noise and vibration problems caused by the unstable contact state of the brush and the commutator of the DC motor by only applying the simple control logic.

It is possible to solve motor noise and vibration generated when the steering wheel is held at a specific position while the vehicle is stopped, and it is possible to omit a damping coupler, which has been employed for reducing vibration and noise, from the DC motor, as a result, manufacturing cost may be expected.

As a result, it is possible to improve marketability of the vehicle provided with the motor driven steering system employing the DC motor as the steering motor.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
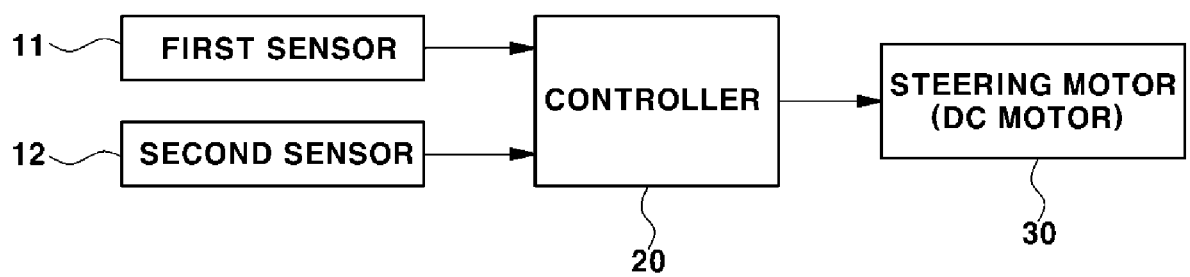
FIG. 1 is a block diagram showing a configuration of a control apparatus of a motor driven steering system according to various exemplary embodiments of the present invention.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the present invention will be described in conjunction with exemplary embodiments of the present invention, it will be understood that present description is not intended to limit the present invention to those exemplary embodiments. On the contrary, the present invention is intended to cover not only the exemplary embodiments of the present invention, but also various alternatives, modifications, equivalents and other embodiments, which may be included within the spirit and scope of the present invention as defined by the appended claims.

Throughout the specification, the expression of "any part includes any component" means that any part does not exclude other components, but may further include other components, unless instructed otherwise.

Various aspects of the present invention provide an apparatus and method of controlling a motor driven steering system, which can solve effectively a motor noise problem caused by an unstable contact state between a brush and a commutator in a vehicle employing a DC as a steering motor.

Various aspects of the present invention provide a control apparatus and a control method for solving a "humming" noise problem which may be generated during steering assist operation of a DC motor (applying a current amount, that is equal to or greater than a certain level, to the motor) when a steering wheel is held at a specific location while a vehicle is stopped.

To achieve the above objects, in various exemplary embodiments of the present invention, control logic is configured to perform a motor current control for reducing noise (or noise and vibration) only during steering assist operation of the DC motor configured for holding the steering wheel while the vehicle is stopped.

In various exemplary embodiments of the present invention, the motor current control for reducing noise (or noise and vibration) is performed by a controller when both a vehicle stopping condition and a steering wheel holding condition are satisfied, wherein the steering wheel holding may mean a situation in which a driver holds the steering wheel without additionally steering the steering wheel for a predetermined time in a state in which a driver has steered (manipulated rotationally) the steering wheel over a certain level.

In addition to the above, since the motor-applied current for steering assistance is increased if a driver has steered the steering wheel over a certain level, the present invention may be configured to perform the motor current control for reducing noise when a driver does not steer additionally the steering wheel for a predetermined time in a state in which a driver has steered (manipulated rotationally) the steering wheel over a certain amount.

Here, the expression that the driver has steered the steering wheel over a certain amount as mentioned above may indicate that the amount of current applied to the steering motor configured for steering assistance reaches a current amount at which noise is apt to be generated.

Figure 2:
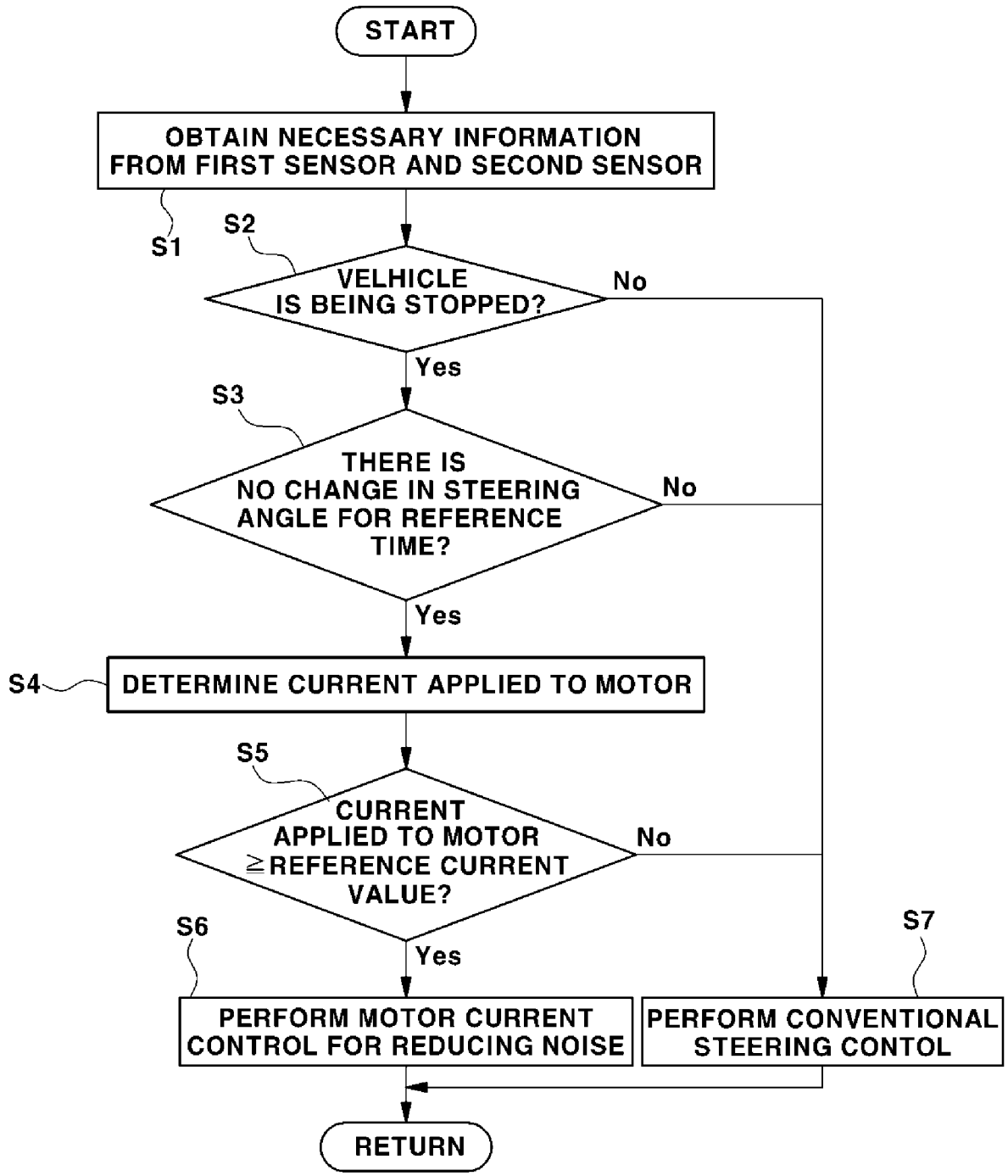
FIG. 2 is a flow chart showing a method of controlling the motor driven steering system according to various exemplary embodiments of the present invention.

The present invention is described with reference to the drawings. FIG. 1 is a block diagram showing a configuration of a control apparatus of a motor driven steering system according to various exemplary embodiments of the present invention, and FIG. 2 is a flow chart showing a method of controlling the motor driven steering system according to various exemplary embodiments of the present invention.

Figure 3:
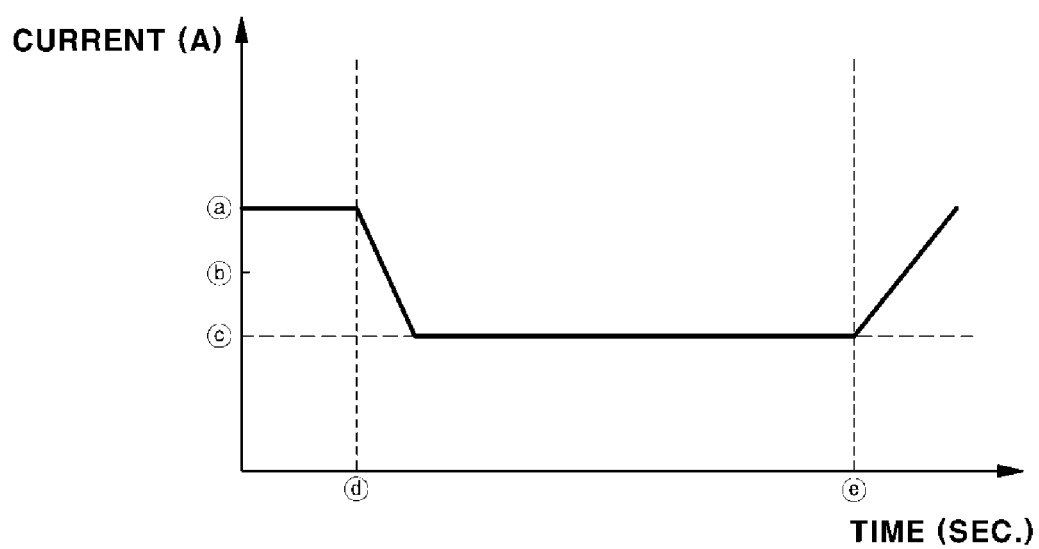
FIG. 3 is a view showing an example of a state in which a current is applied in a method of controlling the motor driven steering system according to various exemplary embodiments of the present invention.
Figure 4:
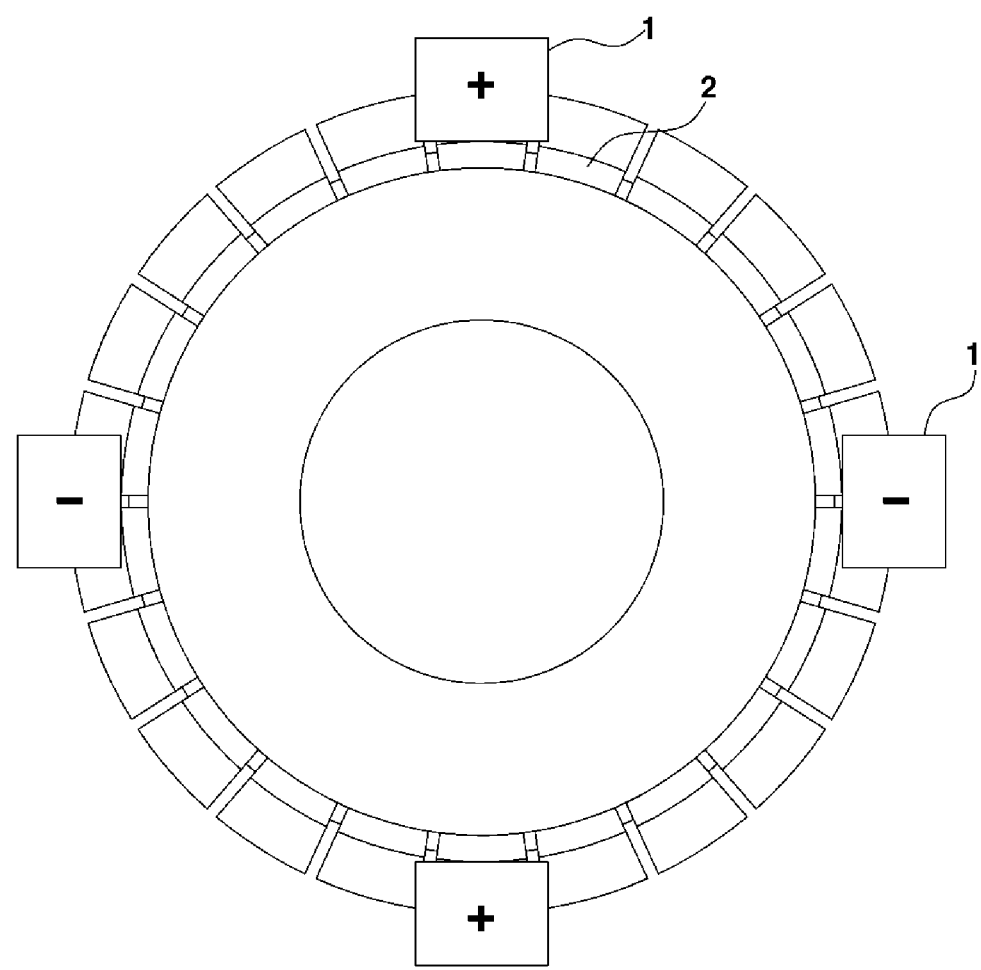
FIG. 4, FIG. 5, FIG. 6 and FIG. 7 are views for describing problems caused when a DC motor is employed as a steering motor.
Figure 5:
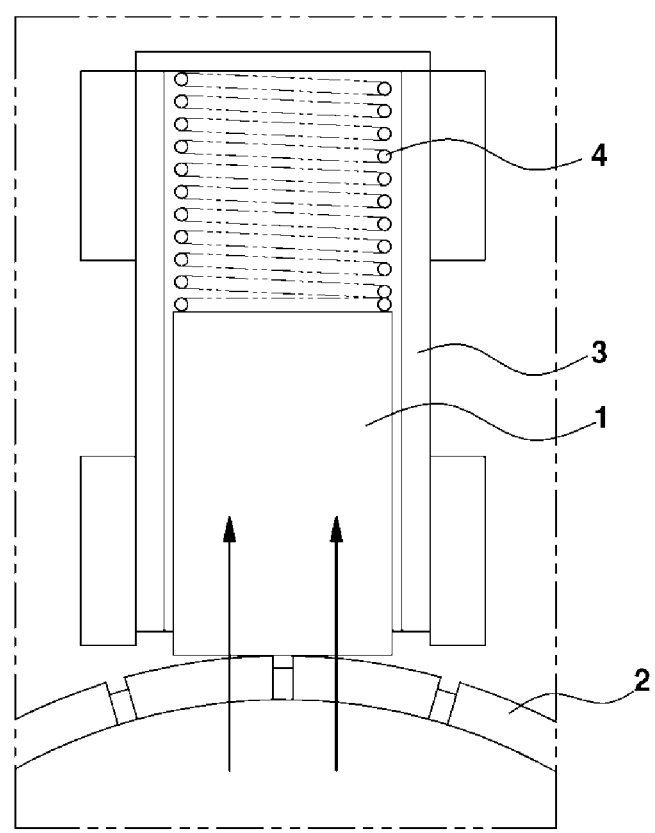
Figure 6:
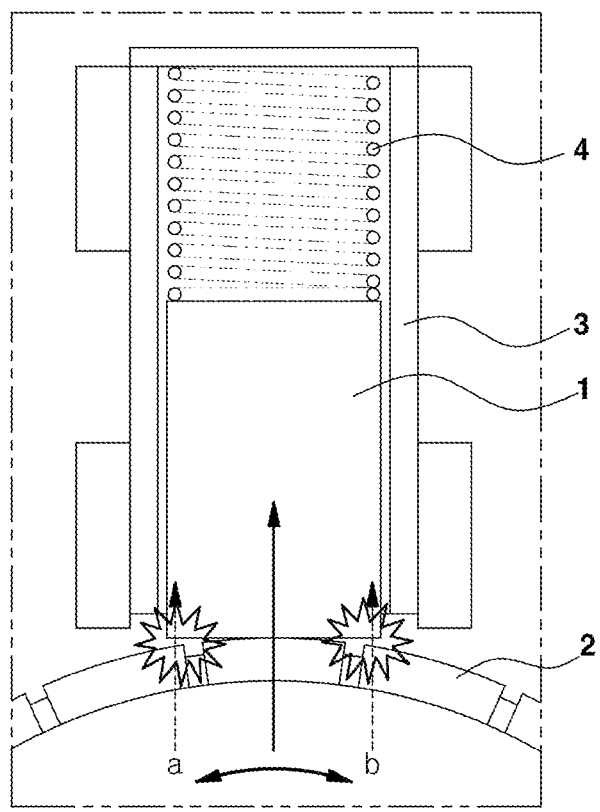
Figure 7:
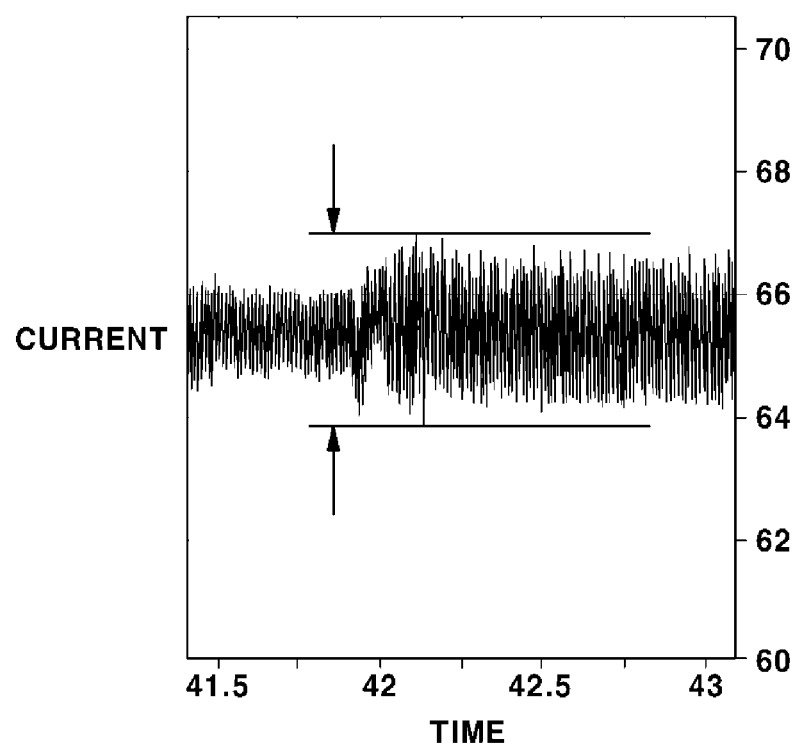

FIG. 3 is a view showing an example of a state in which a current is applied in a method of controlling the motor driven steering system according to various exemplary embodiments of the present invention.

First, the control apparatus according to various exemplary embodiments of the present invention is applied to a motor driven steering system employing a DC motor as a steering motor, and may include a first sensor 11 detecting a vehicle speed or a wheel speed, a second sensor 12 detecting a steering angle, and a controller 20 configured to control a current applied to a steering motor 30, on the basis of information detected by the first sensor 11 and the second sensor 12, as shown in FIG. 1.

The first sensor 11 may be a known vehicle speed sensor for detecting the vehicle speed, and the vehicle speed may be obtained from a signal of a wheel speed sensor mounted at each wheel of a vehicle, and so the first sensor 11 may also be the wheel speed sensor mounted on each wheel of the vehicle.

In a general vehicle, it is possible to obtain wheel speed information from the signals of the wheel speed sensors provided on a plurality of wheels and to convert the obtained wheel speed into the vehicle speed to obtain vehicle speed information.

In various exemplary embodiments of the present invention, the controller 20 may judge from the vehicle speed information or the wheel speed information obtained from a signal of the first sensor 11 whether the vehicle is in a stopped state. For example, if the first sensors 11 are wheel speed sensors mounted on right and left wheels, respectively, the controller 20 may confirm whether the vehicle is in a traveling or in the stopped state from wheel speed values of the left wheel and the right wheel obtained from the signals of the two wheel speed sensors.

In this way, the controller 20 may determine the stopped state of the vehicle using the vehicle speed detected by the first sensor 11 or using the vehicle speed converted from the wheel speed detected by the first sensor 11, or may determines immediately the stopped state of the vehicle from the wheel speed detected by the first sensor 11.

In various exemplary embodiments of the present invention, the above control logic added to the controller 20 for reducing noise (or noise and vibration) is set to be operated only while during the vehicle is stopped.

The second sensor 12 may be a steering angle sensor used in a steering system, and the controller 20 receives a signal of the second sensor 12 to obtain steering angle information according to a driver's steering wheel manipulation.

In various exemplary embodiments of the present invention, the controller 20 may recognize driver's steering intention from the steering angle detected by the second sensor 12, and may judge from the steering angle information detected by the second sensor 12 whether a steering wheel is held.

The reference time is a tunable time, may be determined according to a vehicle condition, and the like. In various exemplary embodiments of the present invention, the reference time is not limited to a specific time, but it is preferable to set the reference time to a time below 1 second so that a driver cannot perceive "humming" motor noise.

Furthermore, in various exemplary embodiments of the present invention, the controller 20 may be set to perform a motor current control for reducing noise (or noise and vibration) when a motor current condition in which motor noise may be generated as well as a condition in which the vehicle is stopped and a condition in which the steering wheel is held are satisfied.

Here, the motor current condition in which motor noise may be generated is a condition for a current amount that is being currently applied to the motor 30, and may be set as a current condition in which "humming" noise and vibration caused by noise may be generated, for the reason described above.

In various exemplary embodiments of the present invention, the controller 20 may be a controller (MDPS ECU) 30 of the motor driven steering system. In the conventional motor driven steering system, the controller 20 determines a current target value according to driver's steering input information and vehicle status information to control a current applied to the steering motor 30, and so the controller 20 itself perceives the current applied to the steering motor 30.

In various exemplary embodiments of the present invention, the controller 20 is provided to constantly monitor the current applied to the motor 30, wherein the motor current condition may be set into the controller 20 as the condition in which the current that is being applied to the motor is equal to or greater than a predetermined reference current value.

As a result, in various exemplary embodiments of the present invention, when the condition in which the vehicle is in a stopped state and the condition in which the steering wheel is held, as well as the condition in which the motor-applied current that is monitored is equal to or greater than the reference current value are satisfied, the controller 20 performs a motor current control for reducing noise.

In the motor driven electric steering system to which various exemplary embodiments of the present invention is applied, when the current having a value equal to or greater than a predetermined current value is applied to the DC motor acting as the steering motor 30, current oscillation is increased, and "humming" noise is thus apt to be generated.

For example, assuming that the maximum current that may be applied to the DC motor acting as the steering motor 30 in the motor-driven steering system is 70 A (amperes), "humming" noise is apt to be generated in the DC motor when the current of 50 A or more is applied.

In various exemplary embodiments of the present invention, a control logic is configured such that the current value (ampere, A) at which "humming" noise is apt to be generated in the vehicle as described above is confirmed, this current value is set to the controller 20 as the reference current value, and the controller 20 confirms the motor-applied current, that is being monitored, to determine that the motor current condition is satisfied when the current equal to or greater than the predetermined reference current value is applied to the motor 30.

Hereinafter, a control process according to various exemplary embodiments of the present invention is described with reference to FIG. 2.

Firstly, the information on the present vehicle speed or wheel speed is obtained from the signal of the first sensor 11 and the steering angle information is obtained from the signal of the second sensor 12 (S1) in the controller 20, and then the controller 20 judges from the vehicle speed information or the wheel speed information whether the vehicle is currently stopped (S2).

Here, when it is determined that the vehicle is stopped, the controller 20 judges whether the condition for performing the motor current control for reducing noise (or noise and vibration) is satisfied, on the basis of the steering angle obtained from the signal of the second sensor 12 and the motor-applied current that is being currently monitored.

At this time, the controller 20 confirms whether the steering wheel is in a state in which there is no change in the steering angle for the reference time (S3), and checks subsequently the present motor-applied current (S3), and then confirms whether the present motor-applied current is equal to or greater than to the reference current value (S4).

If the steering wheel is in the state in which there is no change in the steering angle for the reference time, the controller 20 determines that the steering wheel holding condition is satisfied, and if the motor-applied current that is being monitored is equal to or greater than the reference current value, the controller 20 determines that the motor current condition is satisfied.

In other words, the controller is configured to determine that the steering wheel is in a steering wheel holding state in which a driver does not manipulate rotationally the steering wheel and the steering wheel is held at a specific position for the reference time, and determines that the current equal to or greater than the reference current value, which may cause a generation of noise, is being applied to the DC motor acting as the steering motor 30.

When all the vehicle stop condition, the steering wheel holding condition, and the predetermined motor current condition (the condition in which a high current is applied to the motor) are satisfied as described above, the controller 20 performs the motor current control for reducing noise (or noise and vibration). At this time, the controller reduces the current applied to the motor 30 to the preset control target value (S6).

Here, the preset control target value is determined as the current value at which no noise is generated from the DC motor, that is the steering motor 30 in the vehicle, and may be set to a value lower than 50 A (amperes), for example.

Referring to FIG. 3, when the vehicle is stopped, if a driver holds the steering wheel without steering (manipulating rotationally) the steering wheel for the time (sec.) ⓓ which is equal to or greater than the reference time (for example, one second) and the present motor-applied current that is being monitored is A (amperes) ⓐ greater than the reference current value ⓑ (for example, 50 A), the controller 20 reduces the motor-applied current to the preset control target value A ⓒ.

At this time, the controller 20 may be set to rapidly reduce the motor-applied current from A ⓐ, that is the present motor-applied current, to A ⓒ, that is the preset control target value, at a predetermined constant gradient (change rate). Here, the change rate of current may be appropriately tuned according to the vehicle condition and the like so that heterogeneity felt by a driver may be minimized.

As described above, in various exemplary embodiments of the present invention, when the vehicle stop condition, the steering wheel holding condition, and the predetermined motor current condition are satisfied, the motor current control allowing the motor-applied current to be rapidly reduced to the preset control target value is performed.

In addition, after reducing rapidly the motor-applied current to the preset control target value, when a driver's steering input is confirmed from the steering angle information detected by the second sensor 12 at the time point ⓔ of FIG. 3 while the motor-applied current is maintained at the preset control target value, in other words, when it is determined that a driver manipulates rotationally (steers) the steering wheel, the controller 20 increases rapidly the motor-applied current to a current value which is determined when a steering is conventionally controlled.

By rapidly recovering the current value, conventional steering assistance performed by the steering motor 30 may be achieved.

In addition, when any one of the vehicle stop condition, the steering wheel holding condition, and the predetermined motor current condition (the condition in which large current equal to or greater than the reference current value is applied) is not satisfied, the controller 20 does not perform the motor current control by which the motor-applied current is reduced to the preset control target value, and a conventional steering control by which the motor-applied current and an output of the steering motor 30 are controlled according to the driver's steering input information and the vehicle status information is performed (S7).

In this way, in various exemplary embodiments of the present invention, in a state in which the steering wheel is held as well as in a state in which the motor-applied current is increased to the noise generation level while the vehicle is stopped, the motor-applied current may be rapidly reduced to prevent noise and vibration from being generated.

When the current applied to the motor is reduced as described above, a location of the commutator of the motor is finely shifted to change the commutator state from an unstable contact state to a stable contact state, as a result, humming noise is not generated.

In addition, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

In addition, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling a motor driven steering system, the apparatus comprising:
    a first sensor configured for detecting a vehicle speed or a wheel speed;
    a second sensor configured for detecting a steering angle in a response to a driver's steering wheel manipulation; and
    a controller connected to the first sensor and the second sensor and configured to selectively perform a motor current control of the motor driven steering system for reducing motor noise according to a present motor-applied current applied to a steering motor of the motor driven steering system when the controller determines, from vehicle speed information or wheel speed information detected by the first sensor, that a vehicle is currently in a stopped state and the controller determines, from steering angle information detected by the second sensor, that a steering wheel is currently in a steering wheel holding state,
    wherein the controller is configured to reduce a current applied to the steering motor to a preset control target value upon performing the motor current control for reducing the motor noise, and
    wherein the controller is configured to reduce the current applied to the steering motor until reaching the preset control target value at a predetermined gradient value upon performing the motor current control for reducing the motor noise.

2. The apparatus of claim 1, wherein the steering motor is a DC motor.

3. The apparatus of claim 1, wherein the controller is configured to determine that the steering wheel is in a steering wheel holding state upon determining that the steering angle received from the second sensor is not changed for a predetermined reference time period.

4. The apparatus of claim 1, wherein the controller is configured to perform a motor current control of the motor driven steering system for reducing the motor noise upon determining that the vehicle is currently in the stopped state, the steering wheel is currently in the steering wheel holding state, and the present motor-applied current is equal to or greater than a predetermined reference current value.

5. The apparatus of claim 1, wherein the preset control target value is set as a motor-applied current value at which the motor noise is not generated in the steering motor of the vehicle, and is input to the controller.

6. The apparatus of claim 1, wherein the controller is configured to reduce the current applied to the steering motor to the preset control target value and keeps the current constant, and then increases the current applied to the steering motor upon determining a driver's steering input from the steering angle information detected by the second sensor.

7. A method of controlling a motor driven steering system, the method comprising:
    detecting, by a first sensor, a vehicle speed or a wheel speed, and detecting, by a second sensor, a steering angle in a response to a driver's steering wheel manipulation;
    determining, by a controller connected to the first sensor and the second sensor, whether a vehicle is currently in a stopped state from vehicle speed information or wheel speed information received from the first sensor;
    in a state in which the vehicle is stopped, determining, by the controller, whether a steering wheel is currently in a steering wheel holding state from steering wheel information received from the second sensor; and
    selectively performing, by the controller, a motor current control of the motor driven steering system for reducing motor noise according to a present motor-applied current applied to a steering motor of the motor driven steering system upon determining that the vehicle is currently in the stopped state and the steering wheel is in the steering wheel holding state,
    wherein the controller is configured to reduce a current applied to the steering motor to a preset control target value upon performing the motor current control for reducing the motor noise, and
    wherein the controller is configured to reduce the current applied to the steering motor until reaching the preset control target value at a predetermined gradient value upon performing the motor current control for reducing the motor noise.

8. The method of claim 7, wherein the steering motor is a DC motor.

9. The method of claim 7, wherein the controller is configured to determine that the steering wheel is in the steering wheel holding state upon determining that the steering angle received from the second sensor is not changed for a predetermined reference time period.

10. The method of claim 7, wherein the controller is configured to perform the motor current control for reducing the motor noise upon determining that the vehicle is currently in the stopped state, the steering wheel is in the steering wheel holding state, and the present motor-applied current is equal to or greater than a predetermined reference current value.

11. The method of claim 7, wherein the preset control target value is set as a motor-applied current value at which the motor noise is not generated in the steering motor of the vehicle, and is input to the controller.

12. The method of claim 7, wherein the controller is configured to reduce the current applied to the steering motor to the preset control target value and keeps the current constant, and then increases the motor-applied current when a driver's steering input is determined from the steering angle information detected by the second sensor.

13. The method of claim 7, wherein the controller includes:
    a processor; and
    a non-transitory storage medium on which a program for performing the method of claim 10 is recorded and executed by the processor.

14. A non-transitory computer readable medium on which a program for performing the method of claim 7 is recorded.

* * * * *